(12) United States Patent
Steinhauser

(10) Patent No.: US 12,494,277 B2
(45) Date of Patent: Dec. 9, 2025

(54) MEDICATION ADHERENCE SYSTEM

(71) Applicant: Michael K. Steinhauser, New Brighton, MN (US)

(72) Inventor: Michael K. Steinhauser, New Brighton, MN (US)

( * ) Notice: Subject to any disclaimer, the term of this patent is extended or adjusted under 35 U.S.C. 154(b) by 191 days.

(21) Appl. No.: 18/037,954

(22) PCT Filed: Nov. 22, 2021

(86) PCT No.: PCT/US2021/060363
§ 371 (c)(1),
(2) Date: May 19, 2023

(87) PCT Pub. No.: WO2022/109401
PCT Pub. Date: May 27, 2022

(65) Prior Publication Data
US 2023/0420099 A1    Dec. 28, 2023

Related U.S. Application Data

(60) Provisional application No. 63/116,775, filed on Nov. 20, 2020.

(51) Int. Cl.
*G16H 20/13* (2018.01)
*G16H 10/60* (2018.01)
(Continued)

(52) U.S. Cl.
CPC .............. *G16H 20/13* (2018.01); *G16H 40/67* (2018.01); *H04N 23/51* (2023.01); *H04N 23/54* (2023.01);
(Continued)

(58) Field of Classification Search
CPC ...... H04N 23/651; H04N 23/51; H04N 23/54; H04N 23/57; H04N 23/60; H04N 7/185;
(Continued)

(56) References Cited

U.S. PATENT DOCUMENTS 4,616,316 A    10/1986  Hanpeter et al.
5,412,372 A     5/1995  Parkhurst et al.
(Continued)

FOREIGN PATENT DOCUMENTS

| CA | 2353350 A1 | 1/2003 |
| CN | 108538355 A | 9/2018 |

(Continued)

OTHER PUBLICATIONS

Extended European Search Report in European Application No. 21895764.5, dated Sep. 4, 2024, 7 pages.
(Continued)

*Primary Examiner* — Twyler L Haskins
*Assistant Examiner* — John M Morehead, III
(74) *Attorney, Agent, or Firm* — Christensen, Fonder, Dardi & Herbert PLLC; Douglas J. Christensen

(57) ABSTRACT

A medication adherence system and device are disclosed including a medicine dispensing cup having a sensor portion including a processor, memory, power supply, network adaptor therein, and a camera, the camera directed upwardly and positioned at the top of the sensor portion. In various embodiments a medicine containment portion to hold consumable medicine placed within is attachable with the sensor portion and may include a transparent portion on its bottom. When attached, the transparent portion is aligned with the camera such that the camera views upwardly through the bottom where the camera is configured to capture medication adherence data indicating whether medicine within the attached medicine containment portion has been consumed. The medicine dispensing cup may be received in a base unit that may provide charging of the power supply and further complementary medication adherence data. Data received from or derived from the camera may be provided to EMR systems.

20 Claims, 11 Drawing Sheets

(51) Int. Cl.
*G16H 40/67* (2018.01)
*H04N 7/18* (2006.01)
*H04N 23/51* (2023.01)
*H04N 23/54* (2023.01)
*H04N 23/57* (2023.01)
*H04N 23/65* (2023.01)

(52) U.S. Cl.
CPC ........... *H04N 23/57* (2023.01); *H04N 23/651* (2023.01); *G16H 10/60* (2018.01); *H04N 7/185* (2013.01)

(58) Field of Classification Search
CPC ........ G16H 20/13; G16H 40/67; G16H 10/60; A61J 2200/30; A61J 2200/70; A61J 7/0046
See application file for complete search history.

(56) References Cited

U.S. PATENT DOCUMENTS

| | | | |
|---|---|---|---|
| 5,871,831 A | 2/1999 | Zeiter et al. | |
| 8,579,116 B2 | 11/2013 | Pether et al. | |
| 8,605,165 B2 | 12/2013 | Hanina et al. | |
| 8,670,066 B2 | 3/2014 | Newcomb et al. | |
| 8,740,077 B2 | 6/2014 | Needham et al. | |
| 9,445,972 B2 | 9/2016 | Arad et al. | |
| 9,679,113 B2 | 6/2017 | Hanina et al. | |
| 9,886,751 B2 | 2/2018 | Jacobs et al. | |
| 10,089,445 B2 | 10/2018 | Lesau et al. | |
| 10,229,321 B2 | 3/2019 | Gershtein et al. | |
| 10,282,971 B2 | 5/2019 | Mehregany | |
| 10,297,032 B2 | 5/2019 | Hanina et al. | |
| 10,322,064 B2 | 6/2019 | Mehregany | |
| 10,373,016 B2 | 8/2019 | Guan et al. | |
| 10,431,070 B2 | 10/2019 | Mehregany | |
| 10,445,472 B2 | 10/2019 | LeBrun | |
| 10,565,855 B2 | 2/2020 | Mehregany | |
| 10,596,072 B2 | 3/2020 | Hines | |
| 10,634,633 B2 | 4/2020 | Mehregany | |
| 10,650,661 B2 | 5/2020 | Mehregany | |
| 10,729,028 B2 | 7/2020 | Mehregany | |
| 10,751,259 B1* | 8/2020 | Dutta .................... | A61J 7/0472 |
| 10,874,587 B2 | 12/2020 | Kaplan et al. | |
| 10,952,927 B2 | 3/2021 | Mehregany | |
| 11,129,770 B2 | 9/2021 | Learmonth et al. | |
| 11,185,468 B2 | 11/2021 | Coleman et al. | |
| 11,193,903 B2 | 12/2021 | Mehregany | |
| 11,195,189 B1* | 12/2021 | Advani .............. | G01G 19/4144 |
| 11,351,087 B2 | 6/2022 | Mehregany | |
| 11,382,836 B2 | 7/2022 | Jonsson et al. | |
| 11,574,719 B2 | 2/2023 | Pullabhatla et al. | |
| 11,622,911 B2 | 4/2023 | Learmonth et al. | |
| 11,635,397 B2 | 4/2023 | Mehregany | |
| 2003/0099158 A1 | 5/2003 | Huerga | |
| 2005/0022826 A1 | 2/2005 | Ruvinskiy | |
| 2005/0061706 A1 | 3/2005 | Reynolds et al. | |
| 2005/0223826 A1 | 10/2005 | Petersen et al. | |
| 2006/0144747 A1 | 7/2006 | Le et al. | |
| 2007/0016443 A1 | 1/2007 | Wachman et al. | |
| 2007/0029213 A1* | 2/2007 | Hall .................... | B65D 83/0454 |
| | | | 206/217 |
| 2008/0105588 A1 | 5/2008 | Tran et al. | |
| 2013/0161207 A1 | 6/2013 | Luciano et al. | |
| 2013/0197693 A1* | 8/2013 | Kamen ................. | G06Q 50/22 |
| | | | 700/244 |
| 2013/0285681 A1 | 10/2013 | Wilson et al. | |
| 2014/0160304 A1* | 6/2014 | Galor .................. | H04N 23/66 |
| | | | 348/207.1 |
| 2015/0286852 A1 | 10/2015 | Sengstaken, Jr. | |
| 2015/0335183 A1* | 11/2015 | Balachandran .......... | G09F 3/02 |
| | | | 206/459.1 |
| 2016/0103085 A1 | 4/2016 | Mehregany | |
| 2016/0117482 A1 | 4/2016 | Hanina et al. | |
| 2016/0132661 A1 | 5/2016 | Dixit et al. | |
| 2016/0212389 A1* | 7/2016 | Mehrotra ................. | A61J 7/04 |
| 2016/0274048 A1 | 9/2016 | Mehregany | |
| 2017/0083687 A1* | 3/2017 | Josyula ................. | A61J 7/0481 |
| 2017/0283151 A1 | 10/2017 | Stormer et al. | |
| 2017/0300659 A1* | 10/2017 | Ziv ........................ | G16H 40/63 |
| 2017/0304153 A1* | 10/2017 | Williamson ........ | G07F 17/0092 |
| 2018/0260665 A1 | 9/2018 | Zhang et al. | |
| 2019/0005800 A1 | 1/2019 | Mehregany | |
| 2019/0080588 A1 | 3/2019 | Mehregany | |
| 2019/0107501 A1 | 4/2019 | Mehregany | |
| 2019/0138864 A1 | 5/2019 | Reyland et al. | |
| 2019/0197872 A1 | 6/2019 | Mehregany | |
| 2019/0198143 A1 | 6/2019 | Corcoran et al. | |
| 2019/0201286 A1 | 7/2019 | Learmonth et al. | |
| 2019/0223312 A1 | 7/2019 | Mehregany | |
| 2019/0244510 A1 | 8/2019 | Mehregany | |
| 2019/0274921 A1 | 9/2019 | Mehregany | |
| 2020/0066387 A1 | 2/2020 | Pullabhatla et al. | |
| 2020/0085686 A1* | 3/2020 | Aliakbarian .......... | A61J 7/0445 |
| 2020/0152312 A1* | 5/2020 | Connor .................. | G06V 20/20 |
| 2020/0209051 A1* | 7/2020 | Trivedi .................. | G01G 17/04 |
| 2020/0256815 A1 | 8/2020 | Mehregany | |
| 2020/0281380 A1* | 9/2020 | Nishida .............. | A47G 19/2255 |
| 2020/0383871 A1 | 12/2020 | Mehregany | |
| 2021/0188501 A1* | 6/2021 | Krafft ............... | G07C 9/00182 |
| 2021/0196566 A1 | 7/2021 | Mehregany | |
| 2021/0404982 A1 | 12/2021 | Mehregany | |
| 2022/0000716 A1 | 1/2022 | Learmonth et al. | |
| 2023/0111861 A1 | 4/2023 | Mehregany | |
| 2024/0390231 A1* | 11/2024 | Steinhauser ........... | G16H 20/13 |

FOREIGN PATENT DOCUMENTS

| | | |
|---|---|---|
| CN | 208444381 U | 1/2019 |
| CN | 110430855 A | 11/2019 |
| CN | 111128361 A | 5/2020 |
| CN | 113993495 A | 1/2022 |
| CN | 110430855 B | 1/2023 |
| EP | 0972507 A1 | 1/2000 |
| EP | 3585348 A1 | 1/2020 |
| EP | 3979971 A1 | 4/2022 |
| EP | 4248641 A1 | 9/2023 |
| JP | 6338454 B2 | 6/2018 |
| JP | 2020513951 A | 5/2020 |
| JP | 2022002744 A | 1/2022 |
| JP | 07062678 B2 | 5/2022 |
| JP | 2022535293 A | 8/2022 |
| JP | 07195397 B2 | 12/2022 |
| JP | 2022189932 A | 12/2022 |
| KR | 2019117717 A | 2/2018 |
| KR | 2022018543 A | 5/2020 |
| WO | WO2018156810 A1 | 8/2018 |
| WO | WO2018204921 A1 | 11/2018 |
| WO | WO2019075102 A1 | 4/2019 |
| WO | WO2020247180 A1 | 12/2020 |

OTHER PUBLICATIONS

Murtadha Aldeer, et al., "A Review of Medication Adherence Monitoring Technologies," Applied System Innovation, published on May 6, 2018, 27 pages.

* cited by examiner

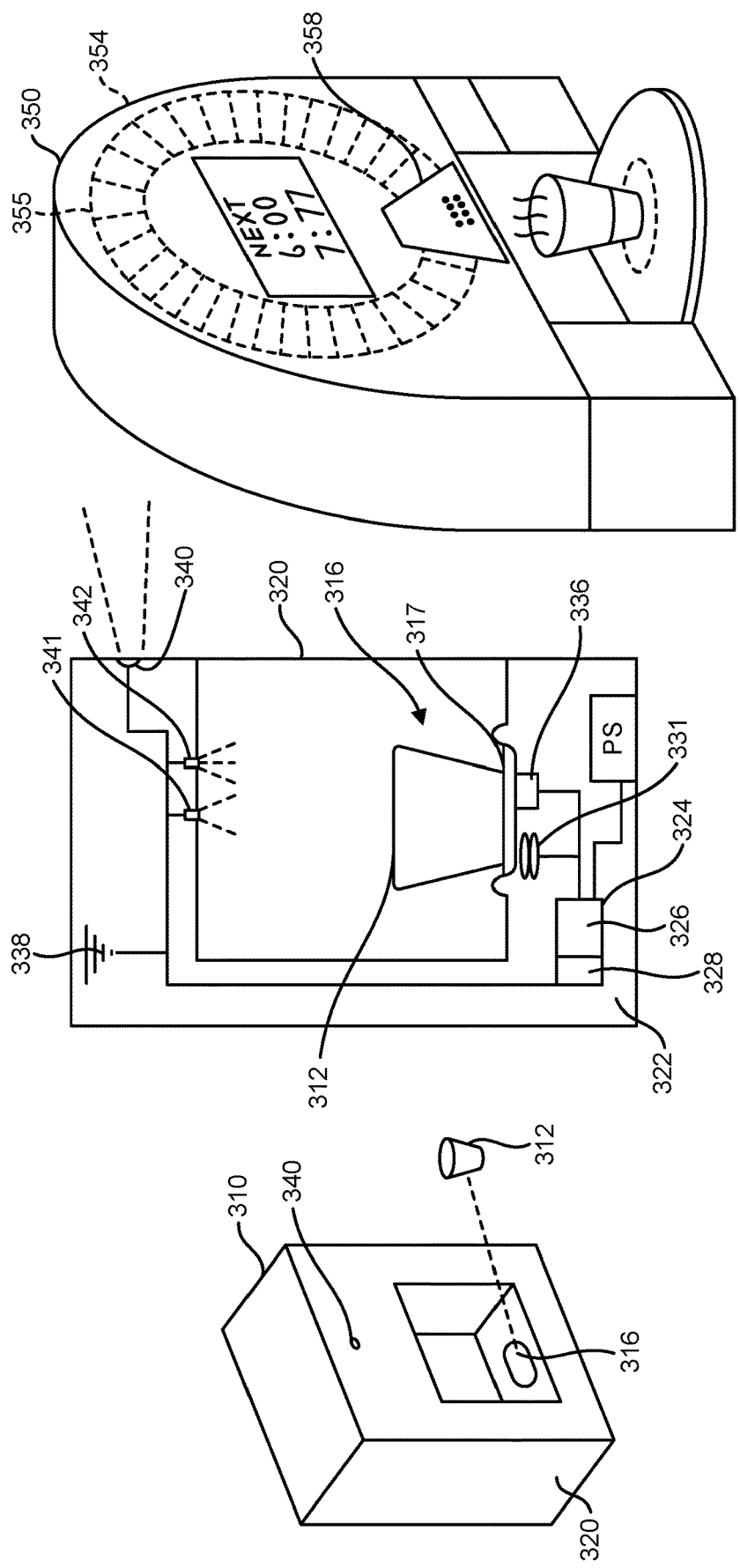

MEDICATION ADHERENCE SYSTEM

CROSS-REFERENCE TO RELATED APPLICATION

The present application is a National Phase entry of PCT Application No. PCT/US2021/060363, filed Nov. 22, 2021, which claims the benefit of U.S. Provisional Application No. 63/116,775, filed Nov. 20, 2020, the entire contents of which are incorporated by reference herein.

FIELD OF THE DISCLOSURE

The present disclosure relates to medication adherence, and more specifically, to sensor systems for detecting medication adherence.

BACKGROUND

In pharmacotherapy, the term medication adherence refers to the extent to which a person taking medication adheres to a self-administered protocol. In other words, medication adherence refers to the medication-intake behavior of the patient in conforming to an agreed medication regimen specified by the healthcare provider with respect to timing, dosage, and frequency. This is a significant issue in long term use of medication for treatment of chronic or other illnesses. For example, even when medications are effective in combating disease, their full benefits are often not realized because, by some estimates, nearly 50% of patients do not take their medications as prescribed. Failure to meet an assigned medication-intake regime can result in various problems including emergence of drug resistance, accelerated progression of disease, major health complications, including death, and, of course, increased hospitalizations and increased health costs.

As such, proper medication adherence is required in order to gain the greatest possible drug benefit during a patient's treatment, and avoid potential complications and related problems with non-compliance. Fortunately, patient interventions have been proven to improve medication adherence when non-adherence is detected. A range of monitoring technologies have been utilized to track medication adherence. Such technologies can fall into various categories including computer vision systems, wearable sensors, smart pill bottles or other smart containers, and ingestible biosensors. In the field of computer vision systems, technologies include image processing for identifying and tracking motion, gestures, and patients to determine when the patient has successfully taken an assigned medicine. For example, such systems use a camera to detect bottle opening, hand-to-mouth, and bottle closing movements. These technologies are discussed further in Murtadha Aldeer, et al., A Review of Medication Adherence Monitoring Technologies, Appl. Syst. Innov. 2018, incorporated by reference herein. In addition, U.S. Pat. No. 10,297,032, incorporated by reference herein, discloses a system using a still or video image capture of a patient's face to recognized and authenticate the identity of a patient along with whether a medication is administered in accordance with the prescribed prescription regimen. In addition, U.S. Pat. Nos. 8,605,165; 8,740,077; 9,679,113; and U.S. Pub. No. 2016/0117482 are each incorporated by reference herein, for all purposes.

Medication non-compliance may be accidental, for example, where the patient simply forgets, or it may be intentional, where the patient deliberately does not consume the medication.

Further improvements to medication adherence detection and identification technologies would be welcome, for example to improve medication adherence to avoid the various problems resulting from non-adherence.

SUMMARY

According to embodiments of the present disclosure, a medication adherence device and system is disclosed. In various embodiments, a medicine dispensing cup has an internal upwardly directed camera into a medicine receiving region. The dispensing cup having a sensor portion with the camera and a medicine containment portion that defines the medicine receiving region. In embodiments, sensor portion including the camera, a battery, circuitry, and information transfer means. In embodiments the information transfer means may be a radio frequency transmitter, that can convey signals including images captured by the camera. In embodiments, the sensor portion may include a power transfer means for recharging the battery. The sensor portion having a sensor portion housing extending for containing componentry therein. In embodiments, the information transfer means may include a processor, memory, and network adaptor therein. In various embodiments the housing secures the camera directed upwardly and positioned at the top of the housing.

In one or more embodiments the medicine containment portion having a sidewall extending from a top portion to a bottom portion, the sidewall defining an open top, the containment portion further having a bottom wall with a bottom surface, the sidewall and bottom wall configured to hold consumable medicine placed within the medicine containment portion via the open top. In various embodiments the medicine containment portion is attachable with the sensor portion and includes a transparent or semi-transparent bottom wall, the transparent or semi-transparent portion being aligned with the camera such that the camera views upwardly through the bottom wall. In one or more embodiments, the camera is configured to capture medication assurance data through the bottom wall that indicates whether medicine within the attached medicine containment portion has been consumed.

In such embodiments, the medicine dispensing cup allows for establishment of a medication adherence system that allows the medication adherence of multiple patients to be easily monitored simultaneously and with minimal medical staffing requirements. As such, various embodiments allow for medication to be delivered and left within a patient's room without supervision while still receiving information informing medical staff as to the patient's adherence to a prescribed medication regimen. Further, various embodiments provide improvements to patient experience by allowing a patent more flexibility in when to take prescribed medicine and to do so without supervision by staff. In addition, various embodiments provide an improved health outcomes for patients by giving medical staff improved data on adherence and to alter or adjust the prescribed medication regimen accordingly.

In embodiments, a medication adherence system includes a medicine dispensing cup having a medicine containment portion and a sensing portion positioned at a bottom of the medicine containment portion. The sensing portion including an upwardly directed camera for viewing the medicine receiving region of the medicine containment portion. In embodiments, the medication adherence system includes a base unit that cooperates with the medicine dispensing cup. The base unit may receive and hold the medicine dispensing cup with the medicine therein, allow the patient or caregiver to remove the dispensing cup with medicine, and the base unit may again receive the medicine dispensing cup after the medicine has been consumed by the patient. The base unit having a seating portion for receiving the medicine receiving cup. The base unit have additional sensors for capturing further medication assurance data. For example, the seating portion may have a weight indicating means that can measure the weight of the medicine dispensing cup with the medicine before dispensing to a patient and after the patient should have taken the medicine. A further camera in the base unit may record the patient or caregiver removing the medicine dispensing cup from the base unit and may further record the patient as the patient consumes the medicine. The base unit may be configured with restricted directional access to the receiving region, such as being from a single direction, for example forward of the unit, and wherein the camera is directed forwardly to maximize the probability that the patient will take the medication in front of the unit and in front of the camera. The base unit may have means for charging the battery in medicine dispensing cups.

A feature and advantage of embodiments, is that the system offers redundancies for confirming medication adherence. A feature and advantage of embodiments is that it is very difficult for a patient to evade the camera in the medication dispensing cup if they intentionally want to avoid taking the medication as the camera can follow the medicine going into the mouth of the patient.

A feature and advantage of embodiments, is that a pharmacist, or caregiver, can view the medication to be consumed by the patient before consumption. The camera positioned in the medicine dispensing cup, or a camera positioned in a base station associated with the medicine dispensing system may allow the pharmacist or caregiver to review and confirm the medicine in the cup. In embodiments where a base station dispenses a dosage of several pills, for example, a camera in a base station and/or in the medicine dispensing cup can view the just dispensed medicine.

A feature and advantage of embodiments, is that a high level of medication adherence may be accomplished without caregivers being present when the medication is taken by the patient. A feature and advantage of embodiments is that presence of the medical adherence systems as described herein, including the overt monitoring, may provide a reminder or instruction with respect to the importance of medication adherence avoiding non-adherence due to forgetfulness. Additionally, the overt monitoring may dissuade patients from intentional non-adherence and/or faked consumption of the medication, thereby minimizing intentional non-adherence.

A feature and advantage of embodiments is that a sensor portion with a camera may be attached to disposable plastic medicine cup. The sensor portion may have a connecting portion configured to couple with existing mass produced medicine cups, or the connecting portion can be configured to only couple with a specifically configured medicine cups.

A feature and advantage of embodiments is a smart medicine dispensing cup having one or more sensors, a processor, a memory and communications means. In embodiments, the dispensing cup has a containment portion and a sensor portion. The sensor portion may include one or more of a presence or weight sensor for detecting the presence of or absence of medicine, such a pills, in the container portion. A camera sensor for capturing images or video of the contents in the medicine dispensing cup, an illumination means for facilitating the camera sensor. The camera and/or illumination means may be triggered, for example, by movement of the dispensing cup, by tilting of the dispensing cup prefatory to consumption of the medicine therein. For example, tilting the dispensing cup can actuate a light emitting diode to capture the medicine exiting the dispensing cup and entering the mouth of the patient. The camera may capture may be one or more images or may comprise a video clip. The communications means can transfer the image to an EMR system, to a care provider, or to a pharmacist. In embodiments, the sensor portion may record in a memory in the sensor portion a plurality or multiplicity of medicine consumption events for later transfer. In embodiments, the sensor portion may have a removable memory card that can be removed and inserted in a card reader connected to a computer for conveyance to care providers, an EMR system, or others involved with the patient.

As such, in one or more embodiments a medication assurance system is described including a plurality of sensor portions, each of the sensor portions including a housing with a top and a bottom, the housing including therein a processor, a non-transitory memory, power supply, and network adaptor, the housing further including therein a camera, the camera directed upwardly and positioned at the top of the housing. In various embodiments the system includes a server device networked with the plurality of sensor portions, the server device comprising a processor, non-transitory memory, and network adaptor. In various embodiments the non-transitory memory of each of the sensor portions includes a set of executable instructions in the form of a computer program product, the executable instructions executable by the processor to cause the sensor portions to: connect to a network with the server device, collect, using the camera, medication adherence data, and transmit the medication adherence data to the server device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A is a perspective view of a medication adherence system, according to embodiments of the disclosure.

FIG. 2B is a cross sectional diagrammatic view of a medication adherence system, according to embodiments of the disclosure.

FIG. 2C is a perspective view of a base station of a medical adherence system, according to embodiments of the disclosure.

Figure 1B:
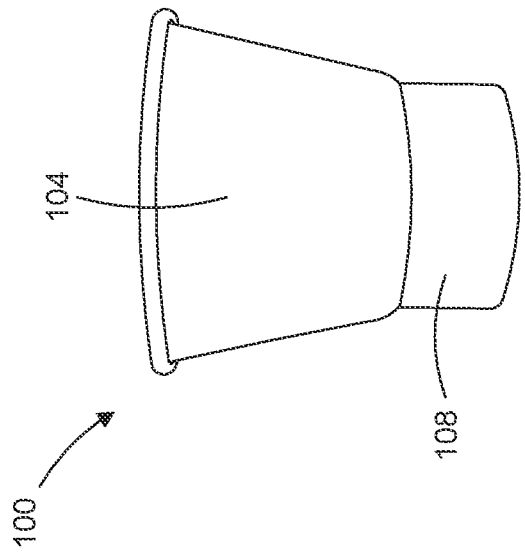
FIGS. 1A-1B depicts side views of a medication adherence device, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 1A:
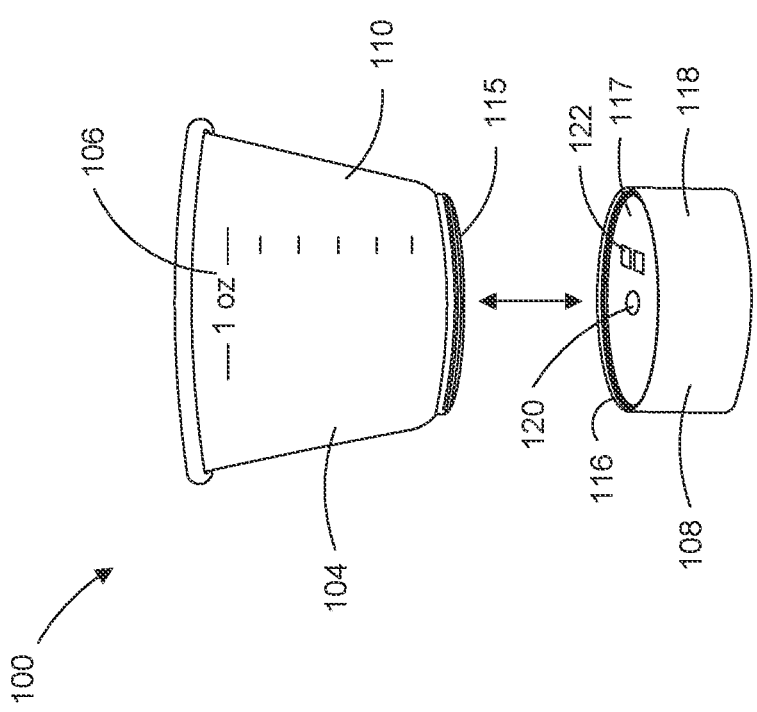
Figure 1D:
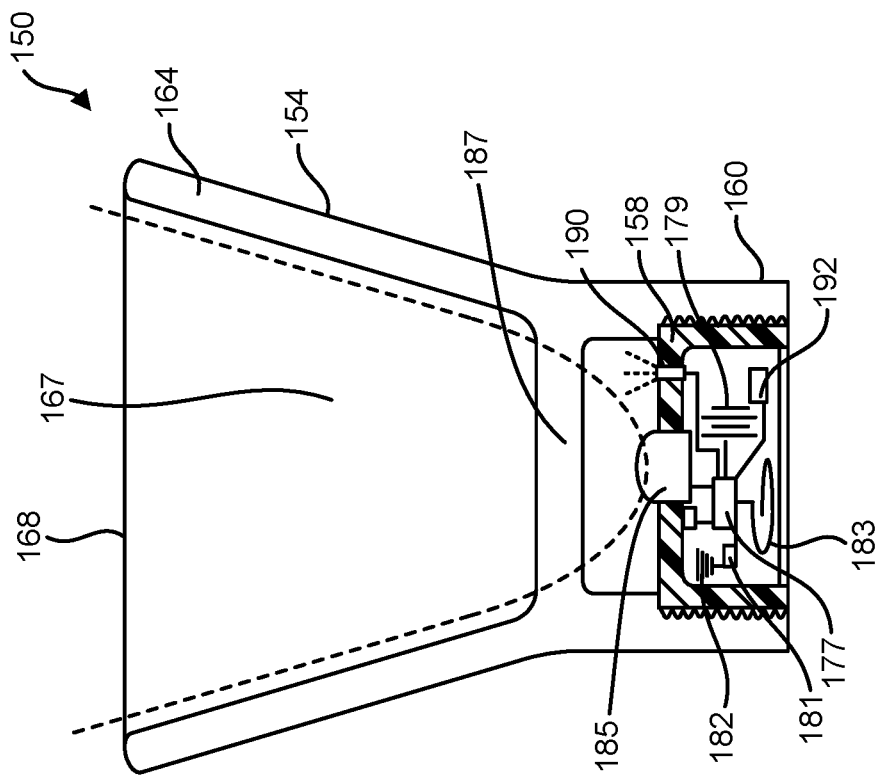
FIG. 1D depicts a cross-sectional view of a medication adherence device, according to one or more embodiments of the disclosure.
Figure 1C:
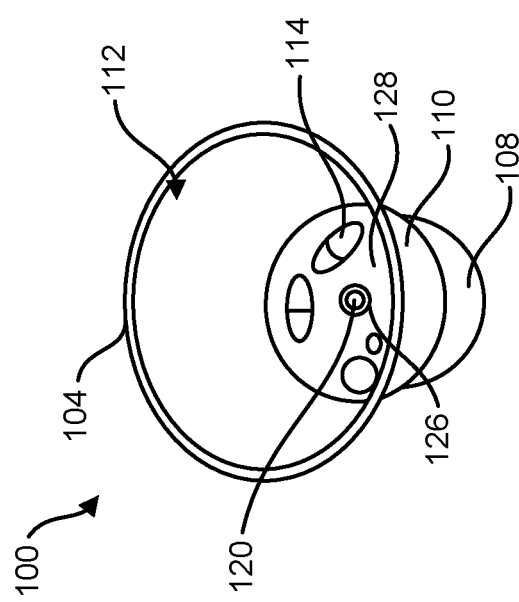
FIG. 1C depicts a top perspective view of the medication adherence device of FIGS. 1A and 1B.

Referring to FIGS. 1A-1C, a medication adherence device configured as a medicine dispensing cup 100 is depicted, according to one or more embodiments of the disclosure. The cup 100 includes a medicine containment portion 104 and a sensor portion 108. In various embodiments, the medicine containment portion 104 is a container structure that is configured to hold and/or store consumable medicine within. Depicted in FIG. 1A-2, the medicine containment portion 104 is a cup defined by a sidewall 110 with an open top 112 that allows for placement and holding of medicine 114 of various forms, such as consumable liquids, pills, or the like. Additionally, in various embodiments the medicine containment portion 104 will have a shape that assists in consumption of the stored medicine. For example, the containment portion 104 of FIGS. 1A-3B will assist a user in directing held medicine from the container and into a patient's mouth for consumption. In embodiments, the internal volume will be about 1.3 ounces or less and may have indicia 106 thereon identify levels corresponding to fill volumes. In embodiments the internal volume will be 2 ounces or less. In embodiments, the gradations may be labeled for, for example, 1 ounce, or 30 ml and portions thereof. In embodiments, the size, that is, the displacement volume of the sensor portion will be less that the internal volume of the medicine containment portion. In embodiments, the sensor portion will have a generally cylindrical shape with a vertical axis, the maximum diameter of the cylindrically shaped sensor portion will be about the same as (within 15%) or less than as the diameter of the lowest portion of the containment portion where the containment portion is frustoconically shaped. In embodiments, the sensor portion will be less than 1.0 inches tall. In embodiments, the sensor portion will be less than 1.4 inches tall. In embodiments, the upper portion of the sensor portion will be conformingly shaped to the lower shape of the containment portion. As such, the medicine containment portion 104 could have a variety of shapes or designs, such as a bottle, bowl, plate, or other suitable design and still be within the scope of embodiments. In various embodiments the medicine containment portion 104 can be constructed from a variety of materials including metal, plastic, glass, ceramic, or other suitable material. In certain embodiments the medicine containment portion 104 could be disposable, intended to be thrown away after use, while in some embodiments the medicine containment portion 104 could be non-disposable and intended to be sanitized and reused. In embodiments, the medicine containment portion may be configured as existing graduated medicine cups formed of transparent plastic, for example polycarbonate, polypropylene, or polystyrene.

In one or more embodiments the sensor portion 108 is a computer device including one or more sensors that are configured to measure and/or detect various data that will indicate the presence of medicine within an attached container, whether the medicine has been consumed, or other information. As such, in various embodiments the medicine containment portion 104 and sensor portion 108 are attachable to one another. For example depicted in FIG. 1A, the medicine containment portion 104 includes a threaded connector 115 that attaches with a corresponded threaded portion 116 at the top 117 of a housing 118 the sensor portion 108 such that the medicine containment portion 104 and sensor portion 108 can be readily attached (FIG. 1B) or separated (FIG. 1A) from one another. In such embodiments, the medicine containment portion 104 can be easily removed and sanitized for reuse, or alternatively removed for disposal. Similarly, the sensor portion 108 can be easily removed for use with a different type of container, removed for charging, storage, repair or for other reason.

In one or more embodiments the sensor portion 108 includes a suite of one or more sensors. Such sensors can include a camera 120, accelerometer, gyroscope, weight scales, or the like. Depicted in FIGS. 1A and 2, sensor portion 108 includes both a camera 120 and weight sensors 122 that operate as a scale to detect objects in the medicine containment portion 104. In one or more embodiments the camera 120 and/or sensors 122 can be positioned on the top 117 of the housing 118. In various embodiments the medicine containment portion 104 can include an aperture 126, or transparent or semi-transparent portion that allows the camera to view upwardly through the bottom wall 128 of the medicine containment portion 104 where the medicine containment portion 104 attaches to the sensor portion 108. In one or more embodiments, the sensor portion 108 includes an accelerometer and/or a gyroscope for detecting movement of the sensor portion 108 and attached medicine containment portion 104 to determine movements that indicate medicine consumption.

Referring to FIG. 1D, another embodiment of a medicine dispensing cup 150 is illustrated. The medicine containment portion 154 may be H-shaped in cross section with the sensor portion 158 received in at recess defined by bottom 160 of the medicine containment portion 154. The upper sidewall 164 of the medicine containment portion 154 defines a medicine receiving region 167 with an open top 168. The sensor portion 158 comprises a housing 172 that may have threads 174 securing the sensor portion to the containment portion 154. Of course, other connection means such as fasteners or cooperating snap-in features may be utilized to secure the two components together. The housing 172 defines an interior that may contain circuitry 177 connecting to the componentry in and associated with the sensor portion. The circuitry may include a control processor 178 with memory for controlling or receiving signals from the componentry in the sensor portion. The housing may contain and/or secure discrete components such as a power supply, for example a rechargeable battery 179, a radio frequency communication unit 181, such as a transceiver or transmitter, an antenna 182, a charging component 183 for the battery, and an upwardly directed camera 185. The camera may be positioned below a transparent wall 187 of the medicine containment portion. In embodiments, the camera may extend to or into the medicine receiving region. In embodiments the sensor portion housing may include an upper transparent wall through which the camera views. In embodiments, the transparent wall may operate as a lens for the camera, and facilitate viewing by the camera of the entire medicine receiving region. In embodiments, the sensor portion may include a motion and/or tilt sensor 189, such as a gyroscope or accelerometer, a light emitting means 190, such as a light emitting diode (LED), and a sound emitter 192. The LED may be actuated, for example when the medicine dispensing cup is tilted as part of the patient induced motion of the consumption of the medicine in the medicine cup. The illumination of the LED may facilitate the capture of images of video by the camera and/or may provide a visual recognition of the patient initiating and/or consuming the medicine in the medicine dispensing cup. Similarly, the sound emitter may be utilized to acknowledge taking the medication or may periodically beep, for example, to remind a patient to take the medicine.

Referring to FIGS. 2A and 2B, a medication adherence system 300 comprising a base unit 310 that receives the medicine dispensing cups 312, such as described above, in a medicine dispensing cup receiving region 316 with a platform 317 of the base unit. The base unit can generally have a base unit housing 320, that has a sensor portion 322 that may comprise base unit circuitry 324, including a processor 326, communication means 328, such as a transceiver, and can further have a charging component 331, such as a coil for charging the battery of the medicine dispensing cup, a presence and/or weight sensor 336, an antenna 338, and a second camera 340 for monitoring the patient, and a third camera 341 for viewing the medicine in the medicine dispensing cup. Illuminating means 342 for the may also be provided for the receiving region. The power supply can include a battery or be connected to a standard 120 volt outlet. In embodiments, data may be transferred from the medicine dispensing cup to the base unit when the medicine dispensing cup is seated on the platform or in the receiving region by means known in the art.

Referring to FIG. 2C, another embodiment of a base station or unit 350 has dosage dispensing means 352 such as a plurality of medicine reservoirs 354, for example configured as pill compartments in a rotating wheel 355. A sliding door or dispensing chute 358 may open to fill the medicine dispensing cup. Such rotating wheels with medicine reservoirs are known, see for example, U.S. Pat. No. 10,596,072 incorporated by reference herein for all purposes. The base unit can have the features as illustrated with respect to the base unit of FIGS. 2A and 2B in addition to the pill dispensing feature.

Figure 3A:
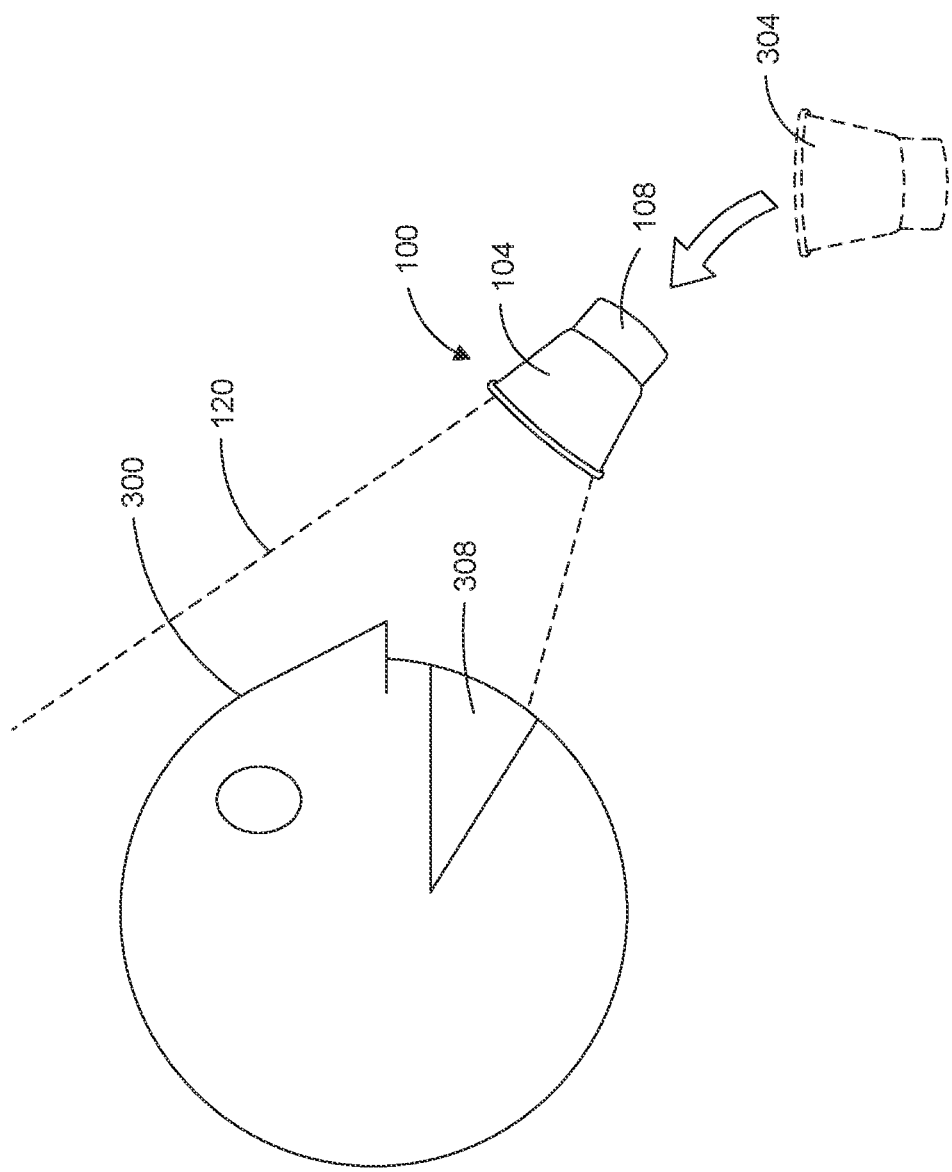
FIGS. 3A-3B depicts the medication adherence device while in use, according to one or more embodiments of the disclosure.
Figure 3B:
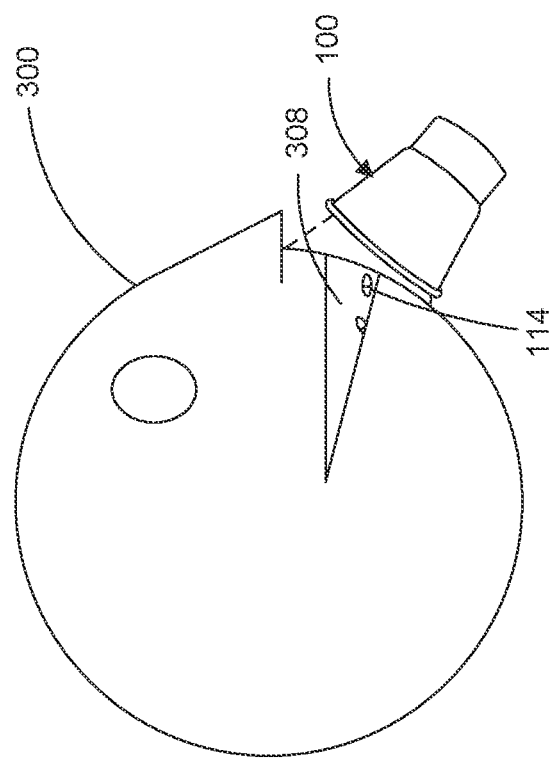

Referring to FIGS. 3A-3B, the medication adherence device 100 is depicted while in use by a patient 300, according to one or more embodiments of the disclosure.

In various embodiments when in use a patient 300 will grasp the medicine adherence device 100 and move the device 100 from an initial resting position 304 towards their face for consumption of the medicine stored therein. In various embodiments, the sensor device 108 can register the presence of medicine within the container device 104 via weight scales, and detect the movement of the device 100 via the accelerometer and/or gyroscope up and tilting in a direction to indicate medicine consumption. In various embodiments, the camera 120 captures an image upwardly from the bottom portion of the container 104. In various embodiments the captured image will include the patient's face and mouth 308 as the container 104 is moved towards the patient. In embodiments, an LED will illuminate facilitating the image or video capture of the camera and/or acknowledging to the patient or others that the medicine is being consumed.

In various embodiments, the camera 120 can be activated based on the movement of the device. For example, once the accelerometer and/or gyroscope detect the upwards and/or tilted movement of the device the camera 120 is activated. In such embodiments, the device could be placed in a sleep mode or low-power mode to preserve battery and transitioned into a full-power mode upon movement of the device 100.

Depicted in FIG. 3B, the camera 120 captures one or more images of the process of moving the device 100 towards the patient's face and captures one or more images of the medicine 114 as it is transferred from the container device 104 into the patient's mouth. In various embodiments, the various data collected, including the weight of objects in the container, the motion and movement of the device 100, and the images and/or video captured by the camera all can be used to indicate whether medicine in the container has been consumed. Referring to FIGS. 2A and 2B, in embodiments, the medicine dispensing cup, where there is a base unit, may be utilized to deliver the medicine to the patient and further confirm medication adherence. Such may be done by weighing the medicine dispensing cup when delivered and after the cup has been removed and replaced in the base unit. Additionally one or more images of the second camera 340 may be utilized to confirm consumption. The second camera may be made operational upon removal of the cup from the base unit, or by the position or motion of the cup as signaled by the cup sensor portion.

Figure 4:
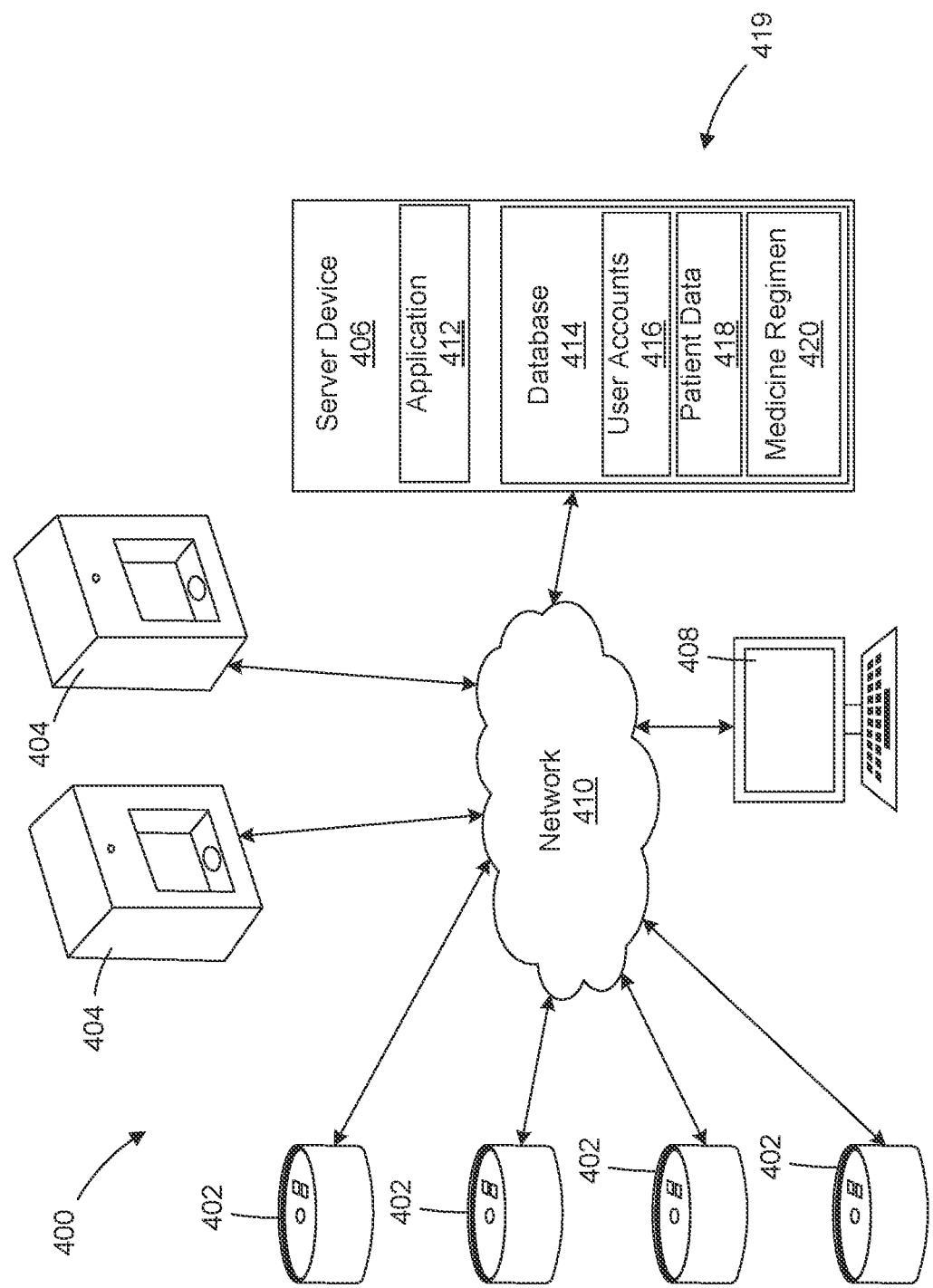
FIG. 4 depicts a medication adherence system, according to one or more embodiments of the disclosure.

Referring to FIG. 4, a medication adherence system 400 is depicted, according to one or more embodiments of the disclosure. In one or more embodiments, the system 400 includes one or more sensor portions 402, 404 of a medication assurance device and a computing node or server device 406. In various embodiments the one or more sensor portions 402, 404 are the same or substantially similar to sensor portion 108 described above with reference to FIGS. 1A-2B. Described further below with reference to FIG. 5, sensor portions 402, 404 are physical devices, including processing elements, memory, sensors, power supply, and networking elements.

In one or more embodiments the server device 406 is a physical device including processing elements, memory, and networking elements. In some embodiments, the server device 406 can include, for example, a desktop computer, laptop computer, tablet device, smart phones, wearable computing device, or other suitable device. In certain embodiments the system 400 includes a user interface device 408. In one or more embodiments the user interface device 408 is a computing device including input and output devices, such as a keyboard, mouse, touch screen, display, and the like, that allows a user to interact with one or more elements of the system, such as the server device 406. In such embodiments the user interface device 408 is a physical device including processing elements, memory, and networking elements, and can include, for example, a desktop computer, laptop computer, tablet device, smart phones, wearable computing device, or other suitable device. In one or more embodiments, the user interface device could be part of the server device 406. In some embodiments the user interface device 408 could be distinct from the server device 406. In such embodiments the user interface device 408 could access server device 406 and/or the one or more sensor portions 402 via a connection over a network 410. In some embodiments the user interface device 408 could interact with the server device 406 and or the one or more sensor portions 402 via a web portal.

Seen in FIG. 4, sensor portions 402 and the server device 406 and user interface device 408 are interconnected via network 410 for communication. In one or more embodiments, the network 410 may be, for example, a local area network, a wide area network, a cloud computing environment, a public network (e.g. the internet), or other suitable network for communication between system elements. In one or more embodiments, the system 400 outputs data and receives inputs to/from users via the sensor portions 402. For example, the user input device 408 includes input/output devices, for example a display and/or touchscreen, for interfacing with a user via a graphical user interface (GUI) or other user interface, that allows a user to view or use system outputs and to create inputs for the system.

Figure 5:
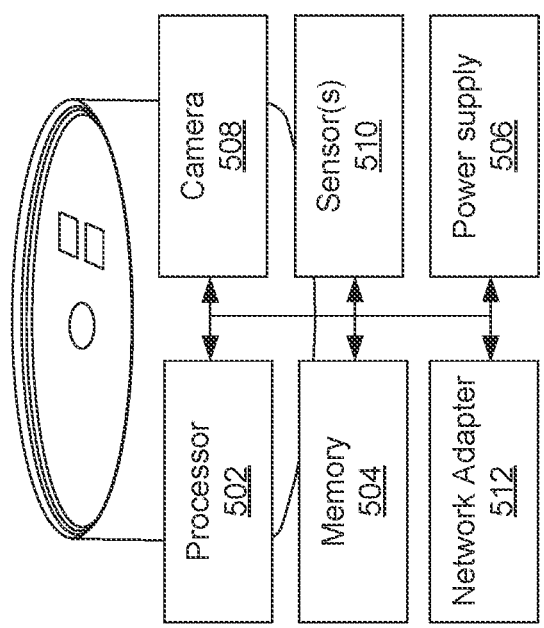
FIG. 5 depicts an architecture view of a sensor portion, according to one or more embodiments of the disclosure.

Referring additionally to FIG. 5, a system architecture for each of the sensor portions 402 is depicted, according to one or more embodiments of the disclosure. As shown, sensor portion 402 is shown in the form of a special-purpose computing device including, but are not limited to, a processor 502, memory 504, power supply 506, camera 508, other sensors 510, a network adapter 512 and a bus that couples various system components. As described in various embodiments the sensors 510 and camera 508 are configured to measure and/or detect various data that will indicate the presence of medicine within an attached container, whether the medicine has been consumed, or other information. In such embodiments the captured data can be fed to one or more other elements of the system 400, such as server 406 via network 410. In various embodiments, memory 504 can include various executable instructions or computer program product for detecting various medicine events or measuring data using the camera 508 and/or other sensors 510.

Referring again to FIG. 4, in some embodiments one or more of the sensor portions 402 and the server device 406 and the user input device 408 includes application 412 ("App"). In some embodiments, the App 412 is a program or "software" that is stored in memory for execution by a logical device. In certain embodiments, App 412 is stored locally on some or all of the system elements. In some embodiments, App 412 is stored remotely, accessible to some or all of the system elements via the network 410. In one or more embodiments, each of the sensor portions 402 may be used with App 412 to perform various functions and/or methods of medicine adherence. For example, in various embodiments App 412 may be used to receive and analyze data from the one or more sensor portions, track patient information, medication regimens, adherence, and other information.

When executing App 412, the user interface device 408 may be configured to communicate with the server 406 to create one or more user accounts. For example, depicted in FIG. 4, server 406 includes database 414, and user interface device 408 communicate via network 410 to establish user accounts 416. User interface device 408 may use App 412 by logging into one or more user accounts 416 and communicating with the server 406. In various embodiments the user accounts 416 may include an administrative account and one or more client accounts. In some embodiments, the administrative account may be a user account including privileges for configuring the system 400. For example, in some embodiments the administrative account may create or modify user accounts 416. In certain embodiments the administrative account may determine privileges for access to patient data 418, or other permissions. In some embodiments, the administrative account may specify a term or expiration date for access to patient data 418. In one or more embodiments, the patient data 418 includes information including, for example, the patient's name, date of birth, contact information, medical records, medication regimen, and the like. The App and server comprising an Electronic Medical Record system 419

In one or more embodiments, the App 412 is configured to record the number of times a patient has successfully taken a medication dosage. For example, the App 412 may be configured to receive user data from the one or more sensor portions 402 indicating that the medication has been taken. The server, executing App 412, may check a stamp time or check off after completion. In some embodiments, the server may update patient data 418 for based on this completion record. In some embodiments, the server, executing App 412, may then update accessible medication adherence statistics for the patient data 418 based on the completion record. In some embodiments, the App 412 may generate a report summarizing the medication adherence metrics for the patient.

In one or more embodiments, the App 412 includes a medication schedule associated with the patient data 418. In such embodiments, the medication schedule can be defined by the administrative account. In various embodiments, the sensor device can additionally include a speaker or haptic engine which is configured to generate noise or vibration to create notifications to users. For example, in various embodiments the device could send notifications to users based on the medication schedule to remind patients to adhere to their prescribed medication regimen 420. Additionally, notifications could be made to indicate a variety of events. For example the sensor portion could notify users when the sensor portion is low on power, has lost signal with the network, or for other events.

Figure 6:
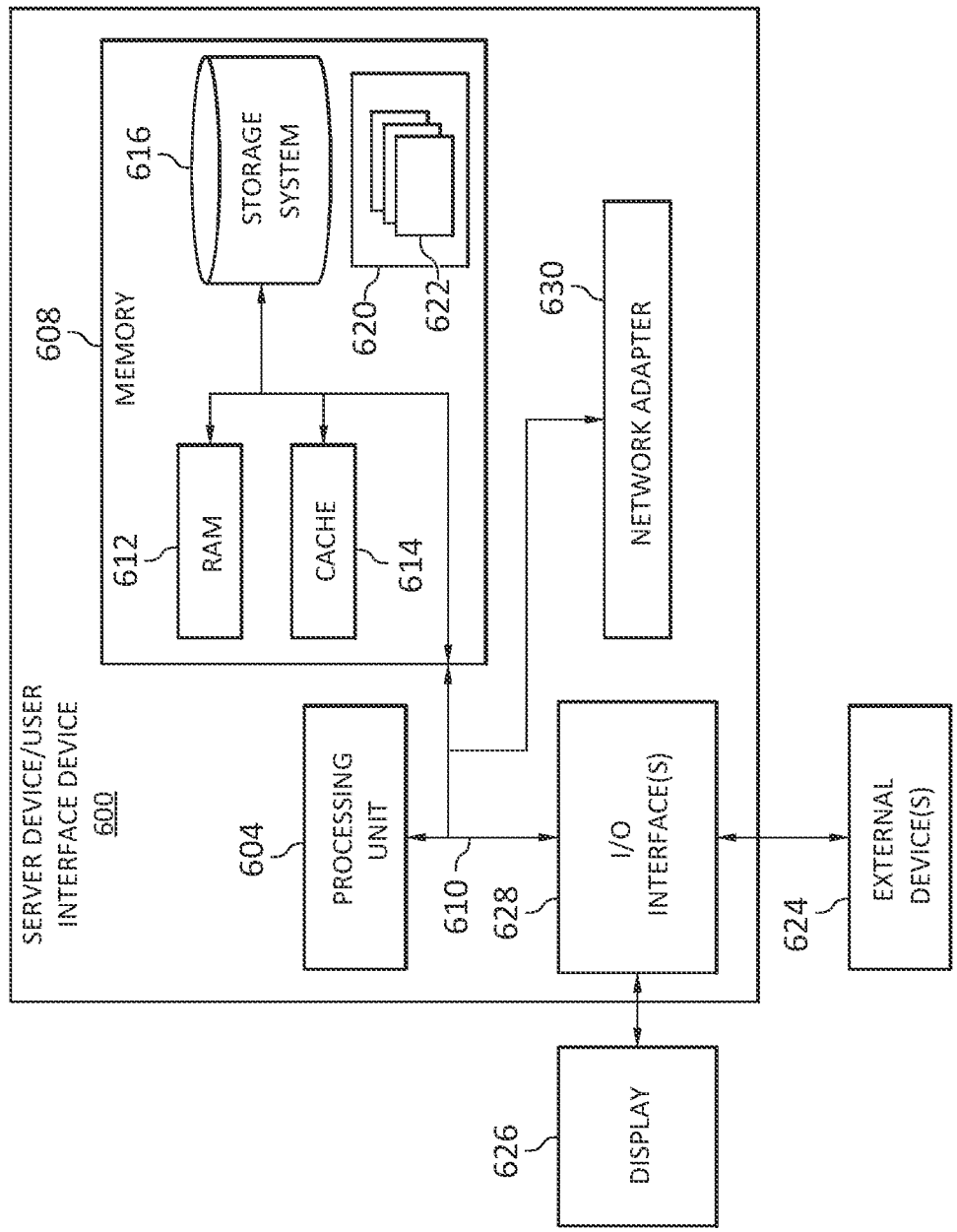
FIG. 6 depicts an architecture view of a computing node/server of a medication adherence system, according to one or more embodiments of the disclosure.

Referring now to FIG. 6, a block diagram of a server device/user interface device 600 is depicted, according to one or more embodiments of the disclosure. Server device/user interface device 600 is only one example of a suitable system and is not intended to suggest any limitation as to the scope of use or functionality of the embodiments described herein. Regardless, server device/user interface device 600 is capable of being implemented and/or performing any of the functionality set forth as described herein.

In embodiments, the App may provide image recognition of the pills in the medicine dispensing cup with electronic sensing thereby providing identification of the pills confirming the presence of the prescribed medicine and confirming the correct operation of any pill dispensing apparatus. Software is known for recognizing pills in different contexts. See, for example, U.S. Pat. No. 10,229,321 and U.S. Pat. Pub. Nos. 2018/0260665 and 2019/0198143, all of which are incorporated herein by reference for all purposes.

Server device/user interface device 600 may be operational with numerous other general purpose or special purpose computing system environments or configurations. Examples of well-known computing systems, environments, and/or configurations that may be suitable for use with server device/user interface device 600 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Server device/user interface device 600 may be described in the general context of computer system, including executable instructions, such as program modules, being executed by a computer system. Generally, program modules may include routines, programs, objects, components, logic, data structures, and so on that perform particular tasks or implement particular abstract data types. Server device/user interface device 600 may be practiced in distributed computing environments where tasks are performed by remote processing devices that are linked through a network. In a distributed computing environment, program modules may be located in both local and remote computer system storage media including memory storage devices.

As shown in FIG. 6, the server device/user interface device 600 is shown including, but not limited to, one or more processors or processing units 604, a system memory 608, and a bus 610 that couples various system components including system memory 608 to processor 604. Bus 610 represents one or more of any of several types of bus structures, including a memory bus or memory controller, a peripheral bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server device/user interface device 600 typically includes a variety of computer readable media. Such media may be any available media that is accessible by server device/user interface device 600, and it includes both volatile and non-volatile media, removable and non-removable media.

System memory 608 can include computer readable media in the form of volatile memory, such as random access memory (RAM) 612 and/or cache memory 614. Server device/user interface device 600 may further include other removable/non-removable, volatile/non-volatile computer storage media. By way of example only, storage system 616 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 610 by one or more data media interfaces. As will be further depicted and described below, memory 608 may include at least one program product having a set (e.g., at least one) of program modules that are configured to carry out the functions of embodiments of the disclosure.

Program/utility 620, having a set (at least one) of program modules 622, may be stored in memory 608 by way of example, and not limitation, as well as an operating system, one or more application programs, other program modules, and program data. Each of the operating system, one or more application programs, other program modules, and program data or some combination thereof, may include an implementation of a networking environment. Program modules 622 generally carry out the functions and/or methodologies of one or more of the embodiments described herein.

Server device/user interface device 600 may also communicate with one or more external devices 624 such as a keyboard, a pointing device, a display 626, etc.; one or more devices that enable a user to interact with computing node/server 600; and/or any devices (e.g., network card, modem, etc.) that enable computing node/server 600 to communicate with one or more other computing devices. Such communication can occur via Input/Output (I/O) interfaces 628. Still yet, computing node/server 600 can communicate with one or more networks such as a local area network (LAN), a general wide area network (WAN), and/or a public network (e.g., the Internet) via network adapter 630. As depicted, network adapter 630 communicates with the other components of computing node/server 600 via bus 610. It should be understood that although not shown, other hardware and/or software components could be used in conjunction with computing node/server 600. Examples, include, but are not limited to: microcode, device drivers, redundant processing units, external disk drive arrays, RAID systems, tape drives, and data archival storage systems, etc.

Figure 7:
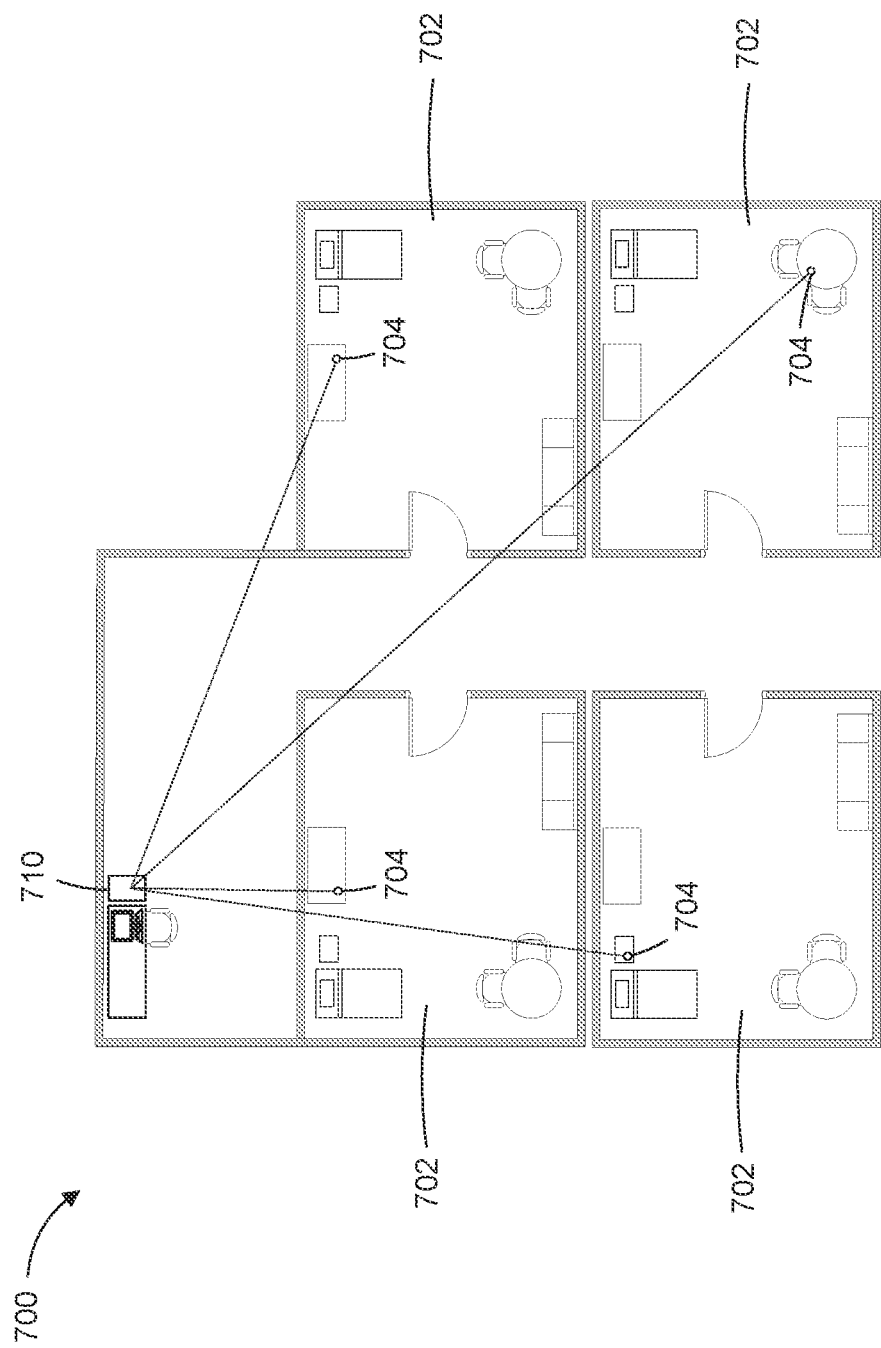
FIG. 7 depicts a medication adherence system while in use, according to one or more embodiments of the disclosure.

FIG. 7 depicts a deployed medication adherence system, according to one or more embodiments of the disclosure. In particular, FIG. 7 depicts a medication adherence system 700 deployed in a multi-room facility 702. As described above with reference to FIGS. 4-6, the system 700 includes a plurality of sensor portions 704 networked together with a server device/user interface device 710. In various embodiments each of the sensor portions 704 are coupled with a respective medicine containment portion, which in turn is supplied with a dosage of a prescribed medication regimen. As described, in various embodiments the sensor portions the sensors and/or camera on the device are configured to measure and/or detect various data that will indicate the presence of medicine within an attached container, whether the medicine has been consumed, or other information. In such embodiments the captured data can be fed to one or more other elements of the system 700, such as the server device/user interface device via a network depicted in FIG. 7 in dotted lines.

In such embodiments, medical adherence for multiple patients can be easily monitored simultaneously. As such, various embodiments allow for medication to be delivered and left within patient's room without staff supervision while still receiving information informing medical staff as to the patient's adherence to the prescribed regimen. Further various embodiments provide improvements to patient experience by allowing a patent more flexibility in when to take prescribed medicine and to do so without supervision by staff. In addition, various embodiments provide an improved health outcomes for patients by giving medical staff improved data on adherence and to alter or adjust the prescribed medication regimen accordingly.

Figure 8:
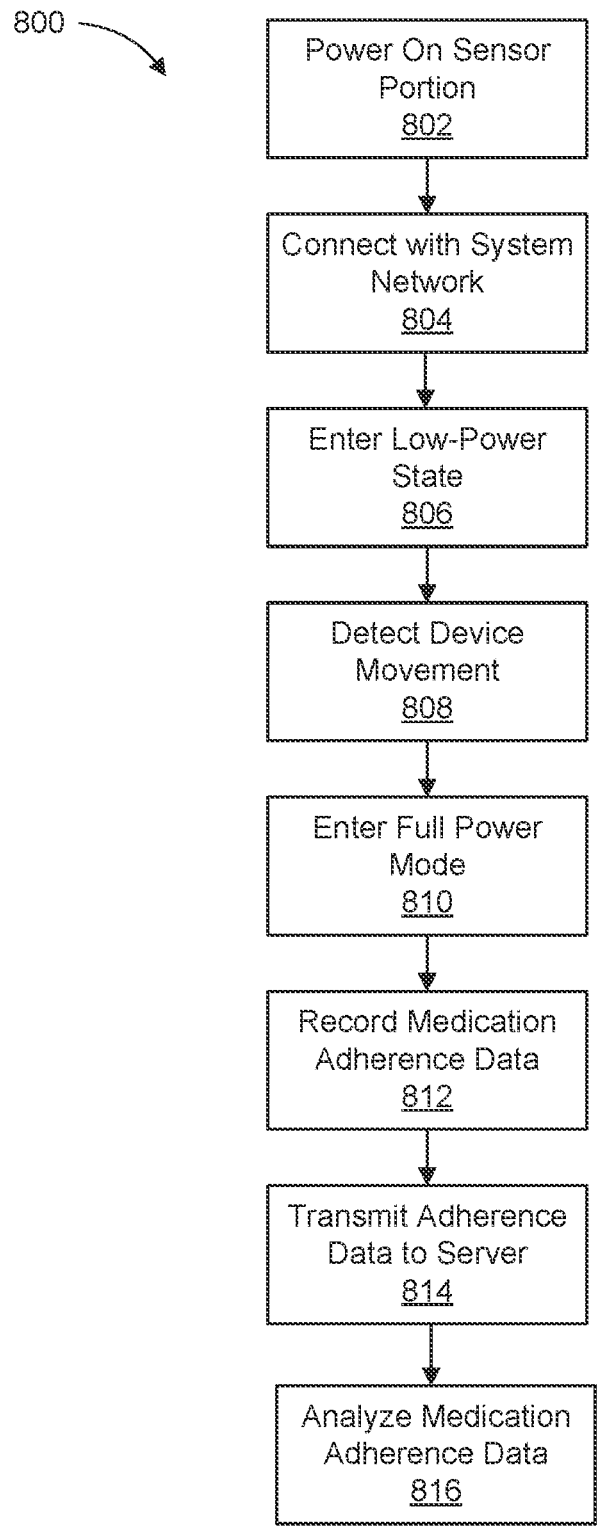
FIG. 8 depicts a method of medication adherence, according to one or more embodiments of the disclosure.

FIG. 8 depicts a method of medication adherence, according to one or more embodiments of the disclosure. In one or more embodiments the method 800 includes at operations 802-804, powering on a sensor portion and connecting with a system network of a medicine adherence system. Sensor portion can be the same or substantially similar to sensor portion described above. As such, sensor portion will include one or more sensors, a camera, power supply, processor, memory, and a network adaptor for connecting to the network. The system network and the medicine adherence system can be the same or substantially similar to the system described above with reference to FIGS. 4-6. In one or more embodiments, when connected to the network, sensor portion can be configured in various ways, receive data, or other instructions via the network.

In various embodiments the method 800 includes at operation 806, entering a low-power state. In one or more embodiments, in the low-power state the sensor portion can power down or temporarily shut off various elements, such as the camera, network adaptor, or the like, to preserve power. In one or more embodiments the method 800 includes, at operations 808-810, detecting device movement and in response entering a full power state. In such embodiments, the sensor portion can include a gyroscope or accelerometer or other sensor to detect movement or tilting of the device. In such embodiments movement can indicate that a user has grasped the device and is in the process of moving or taking medication stored in a container associated with the sensor portion. As such, in operation 810 sensors or other elements are turned back on or re-activated and begin data collection. In one or more embodiments, the method includes, at operations 812-816, recording, transmitting adherence data to the server and analyzing the medication adherence data. In various embodiments the recorded data is stored and/or analyzed by the server to determine whether stored medicine has been successfully taken in accordance with the patient's prescribed regimen.

Figure 9B:
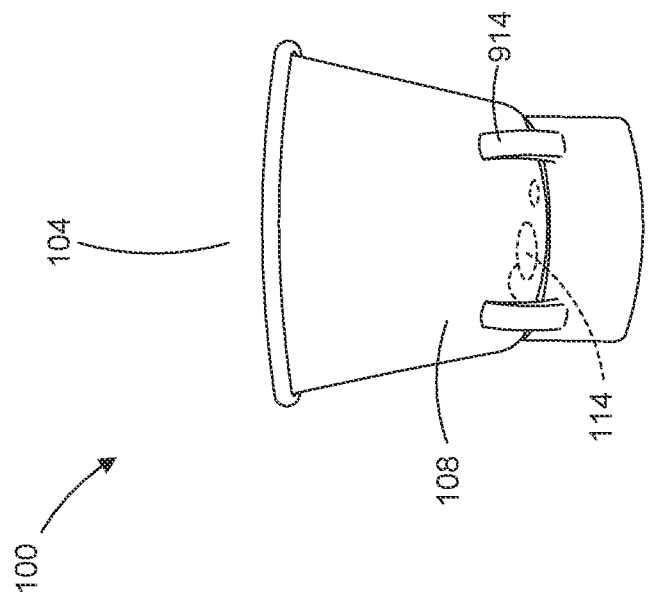
FIGS. 9A-9B depict side views of a medication adherence device, according to one or more embodiments of the disclosure.
Figure 9A:
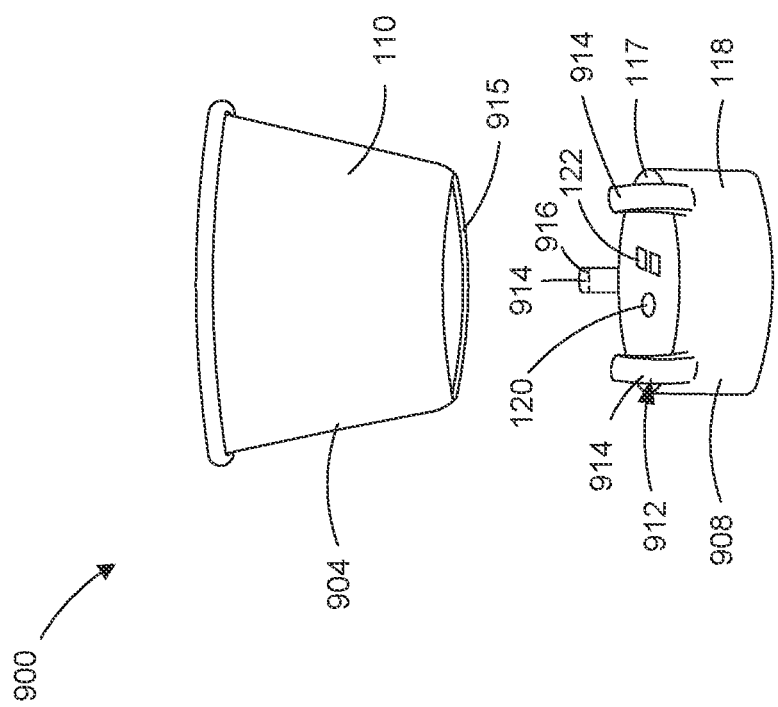

Referring to FIGS. 9A-9B, a medication adherence device 900 is depicted, according to one or more embodiments of the disclosure. As described above with reference to FIGS. 1A-3B, in one or more embodiments the device 900 includes a medicine containment portion 904 and a sensor portion 908. In various embodiments, the medicine containment portion 104 is a container structure that is configured to hold and/or store consumable medicine within. Depicted in FIG. 9A-9B, the medicine containment portion 904 is a cup defined by a sidewall 110 with an open top that allows for placement and storage of medicine within.

Depicted in FIG. 9A, the sensor portion 908 includes a universal attachment mechanism 912 comprising a plurality of attachment arms 914 extending upwardly and inwardly to grip, such as with claws 916, or to friction fit with the medicine containment portion 904 when lowered onto the sensor portion 908. In such embodiments, the sensor portion 908 is configured to fit with a variety of standard cups or containers that may not be specifically designed for attachment with the sensor portion. As such, the sensor portion 908 could be configured for use with a variety of existing containers, including plastic or disposable containers that are intended to be thrown away after use. In various embodiments the attachment arms 914 could be textured, include padding, or other material to increase the friction fit between the arms 914 and the medicine containment portion 904. In embodiments, the medicine containment portion may have be a transparent polymer frustoconical cup, configured as conventional cups, with a lower downwardly protruding lip 915 to facilitate connection to the sensor portions, particularly the sensor portion embodiments with upward extending arms. In embodiments, the sensor portion with select features as described herein, particularly with a camera, may be attached to the top of a container portion, providing a lid.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. In embodiments, a cup, plate, or bowl may be several inches in diameter, have a transparent portion centrally positioned thereon with a sensor portion mounted therebelow with an upwardly directed camera positioned to view through the transparent portion for imaging any items in the cup, plate, tray, or bowl and may be utilized for assembly lines, inventory management, and the like. That is, for identifying and validating presence of components in the cup, plate, tray, or bowl for various machines, equipment, and computers, for example.

The following U.S. Patents are incorporated herein by reference for all purposes: U.S. Pat. Nos. 9,886,751; 8,670,066; 10,229,321; 10,373,016; 10,445,472.

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed. The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. A medication assurance system comprising a medicine dispensing cup with electronic sensing, the medicine dispensing cup comprising:
   a sensor portion including a housing, the housing containing and/or securing a power supply and a camera, the camera directed upwardly and positioned at the top of the housing;
   a medicine containment portion attached to the sensor portion, the medicine containment portion having a sidewall and a bottom wall defining an open top and a medicine receiving region for holding consumable medicine placed within the medicine containment portion via the open top, the medicine containment portion including a transparent or semi-transparent portion on the bottom wall, the transparent or semi-transparent portion aligned with the camera such that the camera views upwardly through the bottom wall;
   wherein when the medicine dispensing cup is raised for consumption of the medicine by a patient, the sensor portion with the camera is raised and the camera captures images of the patient's face and mouth through the bottom wall of the medicine containment portion as the medicine dispensing cup is moved toward the patient.

2. The medication assurance system of claim 1, wherein the sensor portion further includes a processor, memory, and a network adaptor therein.

3. The medication assurance system of claim 2, wherein the sensor portion is connected to an Electronic Medical Records system.

4. The medication assurance system of claim 2, wherein the sensor portion further includes one or more of a gyroscope and accelerometer.

5. The medication assurance system of claim 4, wherein the sensor portion is configured to enter a low-power state after an idle time duration and enter a full-power state in response to movement detected by one or more of the gyroscope and accelerometer.

6. The medication assurance system of claim 1, wherein the medicine containment portion includes a threaded connector configured to attach with a corresponding threaded portion at the top of the sensor portion.

7. A medication assurance system comprising a medicine dispensing cup with electronic sensing, the medicine dispensing cup comprising:
   a transparent medicine dispensing portion having an open top, a sidewall, and a bottom wall, the sidewall having a taper wherein the open top is diametrically larger than the bottom wall;
   a sensor portion comprising a camera positioned below the bottom wall of the medicine dispensing portion, the camera capable of taking video and directed upwardly through the bottom wall;
   wherein the sensor portion is attached to the medicine dispensing portion such that the sensor portion with the camera moves with the medicine dispensing portion as the medicine is consumed.

8. The medication assurance system of claim 7, wherein the sensor portion includes a transmitter for sending video image data generated by the camera.

9. The medication assurance system of claim 7, wherein the sensor portion further includes a processor, memory, and a network adaptor therein.

10. The medication assurance system of claim 7, further comprising a base unit with a receiving region for the medicine dispensing cup, the base unit for dispensing medicine into the medicine dispensing cup.

11. The medication assurance system of claim 10, wherein the base unit has a second camera positioned above the receiving region for monitoring a patient during consumption of medicine in the medicine cup.

12. The medication assurance system of claim 9, wherein the sensor portion is connected to an Electronic Medical Records system.

13. The medication assurance system of claim 7, wherein the medicine containment portion is constructed from transparent plastic.

14. A method of assuring consumption of medicine by a patient, the method comprising:

viewing medicine in a medicine dispensing cup comprising a camera integrated as part of the medicine dispensing cup that views into a medicine receiving volume of the medicine dispensing cup from a bottom of the medicine receiving volume;
taking a video clip or a plurality of still shots with the camera from the bottom of the medicine receiving volume while the medicine dispensing cup is being raised by a patient for consumption of the medicine in the medicine receiving volume; and
continuing taking the video clip or the plurality of still shots while the medicine is dispensed from the medicine dispensing cup to a mouth of the patient capturing the consumption of the medicine by the patient.

15. The method of claim 14, further comprising transmitting the video clip or plurality of still shots from the camera.

16. The method of claim 14, further comprising replacing a medicine container portion of the medicine dispensing cup with another unused medicine container portion.

17. The method of claim 14, wherein the medicine dispensing cup has a medicine container portion and a sensor portion therebelow, the sensor portion comprising the camera, the sensor portion comprising a processor, memory, and a network adaptor, the method further comprising transmitting data representing the video clip or plurality of still shots to an Electronic Medical Records system.

18. The method of claim 14, wherein the medicine dispensing cup has a medicine container portion and a sensor portion therebelow, the sensor portion comprising the camera, the sensor transmitting data representing the video clip or plurality of still shots to an Electronic Medical Records system.

19. The method of claim 14, wherein the medicine dispensing cup is initially seated in a base unit with an additional camera in the base unit, and wherein the method comprises further taking a video clip or one or more still shots of the medicine dispensing cup in the base unit and/or of the patient.

20. The method of claim 14, wherein information regarding the consumption of the medicine by the patient is transmitted by the medicine dispensing cup or the base unit to a network.

* * * * *